(12) United States Patent
Warrier et al.

(10) Patent No.: US 6,892,070 B2
(45) Date of Patent: May 10, 2005

(54) COMMUNICATION SYSTEM AND METHOD FOR MINIMIZING INTERNATIONAL ROAMING COSTS

(76) Inventors: Unnikrishnan S. Warrier, 11797 Chaparal St., Los Angeles, CA (US) 90049; Anne T. Lam, 11797 Chaparal St., Los Angeles, CA (US) 90049; Carlos Rosado, 11549 Rochester Ave., Apt. #2, Los Angeles, CA (US) 90025; Gopalakrishnan Ramanujam, 3740 Keystone Ave., Apt. #205, Los Angeles, CA (US) 90034

( * ) Notice: Subject to any disclaimer, the term of this patent is extended or adjusted under 35 U.S.C. 154(b) by 681 days.

(21) Appl. No.: 10/006,561

(22) Filed: Nov. 5, 2001

(65) Prior Publication Data

US 2003/0092440 A1 May 15, 2003

(51) Int. Cl.[7] ................................................. H04Q 7/20
(52) U.S. Cl. ................................. 455/432.1; 455/445
(58) Field of Search ............................... 455/432.1, 445, 455/406, 407, 412.1, 408, 436, 435.1

(56) References Cited

U.S. PATENT DOCUMENTS

| | | | | |
|---|---|---|---|---|
| 6,006,094 A | * | 12/1999 | Lee ............................. 455/445 |
| 6,104,913 A | * | 8/2000 | McAllister ................. 455/41.1 |
| 6,731,932 B1 | * | 5/2004 | Rune et al. ............. 455/432.1 |
| 6,738,622 B1 | * | 5/2004 | Stadelmann et al. ..... 455/435.1 |
| 2001/0021646 A1 | * | 9/2001 | Antonucci et al. .......... 455/404 |

* cited by examiner

*Primary Examiner*—David Hudspeth
*Assistant Examiner*—Huy D Nguyen

(57) ABSTRACT

A communication system and method for minimizing international roaming costs leverages an existing communication network to convert roaming communication sent to and from a mobile telephone into a series of local telephone calls to and from the communication network. Using a universal address, subscribers of the communication system can initiate or participate in real-time communication through the network while roaming outside of a home system, without incurring roaming charges.

31 Claims, 8 Drawing Sheets

COMMUNICATION SYSTEM AND METHOD FOR MINIMIZING INTERNATIONAL ROAMING COSTS

RELATED APPLICATION DATA

This patent application is related to commonly owned, co-pending U.S. patent application Ser. No. 09/451,480, entitled SYSTEM AND METHOD FOR PROVIDING A PARTICIPATORY BROADBAND COMMUNICATIONS NETWORK, which is incorporated by reference herein.

COPYRIGHT NOTICE

This patent document contains material subject to copyright protection. The copyright owner, Kron Networks Corp., has no objection to the reproduction of this patent document or any related materials, as they appear in the files of the Patent and Trademark Office of the United States or any other country, but otherwise reserves all rights whatsoever.

FIELD OF THE INVENTION

The present invention relates generally to methods and systems for communication, and more particularly to an improved communication method and system optimized for international roaming.

BACKGROUND OF THE INVENTION

Co-pending patent application Ser. No. 09/451,480 discloses an improved communication system and method that includes a number of unique features. One of the features disclosed and described in Ser. No. 09/451,480 is a universal communication address that can be dynamically updated to be mapped to one or more other communication addresses. A universal address is a comprehensive identifier that can be mapped to, and used to communicate with, any number of individual communication addresses such as telephone numbers, facsimile numbers, electronic mail addresses, etc. All incoming and outgoing communication can now be routed through the universal address. As a result, it is no longer necessary for people to remember multiple telephone numbers, facsimile numbers and/or e-mail addresses. Any of these individual communication addresses can be automatically reached using the universal address, assuming that the appropriate mapping is up to date with the most current information. This is particularly useful when individual communication addresses change—for example, when a new mobile telephone account in activated. When this happens, all that is required is that the appropriate mapping associated with the universal address be updated to include the telephone number of the new mobile account. No changes are made to the universal address itself, or to the manner or process in which others attempt to reach the addressee, except that now when they use the universal address, they will be automatically connected to the new mobile telephone number.

There are a number of potential applications that might be able to exploit these and other aspects of universal addressing. One such application is in the area of roaming in wireless telephone systems. Roaming refers to when a subscriber is in a geographical area not served by a subscriber's home network. A mobile station, such as a cellular telephone, has the ability to roam to other cellular systems such as a cellular system other than its home system (i.e., the cellular system in which the subscriber has an account), and place and/or receive calls. A drawback or roaming is that a roaming mobile station will incur additional charges, and possibly long distance charges, when placing or receiving calls. These roaming charges may vary depending upon the particular cellular system in which the subscriber is roaming, but they can be significant, particularly when traveling internationally. For example, a subscriber having a cellular account in the United States who travels abroad to the United Kingdom and attempts to use his United States mobile telephone to call either a local number in the United Kingdom or an international number in the United States may have to pay up to $1.34 per minute in international roaming charges from his United States cellular account. Most individuals who travel internationally on a regular basis are either forced to accept these significant roaming charges or sign-up for different accounts, each with its own telephone number, in each of the countries in which they travel.

Accordingly, a need exists for an improved communication system and method designed to address this issue of international roaming costs. More specifically, a need exists for an improved communication system and method that leverages existing communication networks to allow for real-time communication through a dynamically updateable universal address to reduce or eliminate international roaming costs by converting an international call into a series of local calls over the communication network.

SUMMARY OF THE INVENTION

The present invention provides an improved communication system and method designed to minimize or eliminate international roaming charges. In a presently preferred embodiment, the communication system leverages an existing communication network that includes at least a PBX location in a home system and operatively connected to a PBX location in a roaming system. The communication system also include a database of universal addresses that can be updated in real-time and mapped to one or more individual communication addresses (e.g., local mobile telephone numbers). Subscribers of the communication system use a local mobile station when traveling to the roaming system, effectively replacing their normal home mobile station. Upon reaching the roaming system, a subscriber is prompted to update his universal address to map to the local roaming address code of the local mobile station. Once this updating and mapping occurs, the subscriber is ready to send and/or receive communication through system.

A caller attempting to reach the subscriber from the home system will be connected to the home PBX and prompted to indicate the subscriber's universal address. The home PBX will access the database and determine the appropriate local roaming address code at which the subscriber is located. Using the local roaming address code, the system will identify the roaming PBX and route the call from the home PBX to the roaming PBX. The communication system will identify and use least-cost path to route the call from the home PBX to the roaming PBX, where it will instruct the roaming PBX to initiate a call to the subscriber at the local roaming address code of his local mobile station. In a presently preferred embodiment, the least-cost path is through a trunk that connects the home PBX and the roaming PBX having a negligible marginal cost of sending any particular communication between the home PBX and the roaming PBX. As a result, a communication that normally would have resulted in international roaming charges being incurred (e.g., if the subscriber was called on his home mobile number) is now converted into a series of local or low-cost communications that avoid this significant expense. Specifically, the communication is converted into (1) a local call from the caller to the home PBX in the home system, (2) a call from the home PBX to the roaming PBX over the trunk, and (3) a local call from the roaming PBX to the local roaming mobile station. This can result in savings in excess of 80% of the per-minute charges associated with that communication. The same type of savings can be experienced for communication sent through the system by the subscriber while roaming.

BRIEF DESCRIPTION OF THE DRAWINGS

These and other features and advantages of the present invention will be appreciated as the same become better understood in connection with the accompanying drawings, wherein.

DETAILED DESCRIPTION OF THE INVENTION

Figure 1:
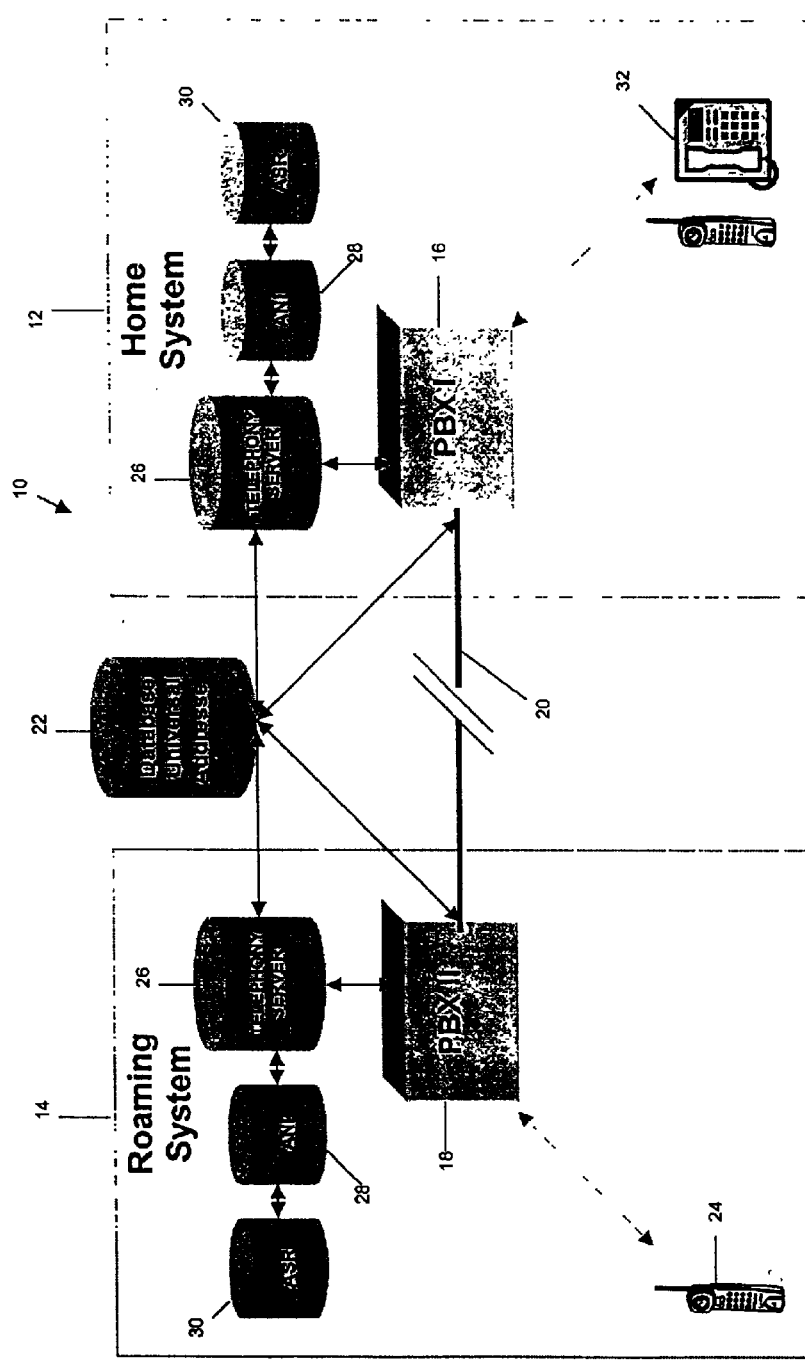
FIG. 1 is a block diagram of a presently preferred embodiment of the communication system according to the present invention.

Referring now to FIG. 1, a block diagram of presently preferred embodiment of the communication system 10 optimized for international roaming is illustrated. The communication system includes a communication network that spans between a home system 12 and a roaming system 14. The terms home and roaming system are used to generically designate communication and/or geographic areas where a given subscriber does and does not have an account for a given mobile station (e.g., mobile telephone). For example, for an individual having a mobile account in the United States who travels to the United Kingdom, the United States would be the home system and the United Kingdom would be the roaming system. The communication network includes at least a first private branch exchange (PBX) 16 located in the home system and a second PBX 18 located in the roaming system. The first PBX 16 and the second PBX 18 are operatively connected to, and in communication with, one another via a trunk 20, tie or private line that provides communication, or transmission of communication signals, between the home and roaming systems. In a presently preferred embodiment, the trunk 20 is owned and/or leased by an enterprise operating the communication system 10 described herein so that the marginal cost of sending a particular communication over the trunk is effectively zero or negligible. A database 22 for storing universal addresses and related information is included in the system and is operatively connected to, and in communication with, the first PBX 16 and the second PBX 18. Each member of, or subscriber to, the communication system will be assigned a universal address that he or she can map to any number of individual communication addresses, such as a telephone number, cellular number, facsimile number, e-mail address, etc. Once this mapping has occurred, anyone trying to reach the subscriber will be able to simply use the universal address, and the communication system will automatically and seamlessly connect the caller to the subscriber using an appropriate one of the subscriber's individual addresses that has been mapped to the subscriber's universal address. The processes of registering, updating and communicating with a universal address through the communication system will be described in more detail below.

The communication system 10 is intended to reduce or eliminate international roaming costs by taking advantage of the communication network that spans between the home and roaming systems 12, 14. Specifically, the communication system 10 is able to reduce or eliminate international roaming costs by converting an attempted international call into a series of local calls through the communication network. In order for this to be possible, it is necessary to provide the subscriber with a local mobile station 24 (e.g., mobile telephone) having a local roaming address code (e.g., telephone number) within the roaming system 14 that he can use to send and/or receive calls through the communication system 10 while in the roaming system. Additionally, it is necessary to map the local roaming address code of the subscriber to his universal address within the database. The processes of providing the subscriber with a local mobile station and updating subscriber's universal address to map to the local roaming address code will be described in more detail below.

In a presently preferred embodiment, the communication network 10 also includes one or more telephony servers 26 operatively connected to, and in communication with, the first or second PBX and the database. As will be described in more detail below, the telephony servers can be used to improve the communication between the PBX and the database, and to provide any necessary instructions for how a call should be routed through the communication system once it is received.

Those skilled in the art should realize that the block diagram of the communication system 10 in FIG. 1 is being used to illustrate the essential components of the system, and other, more complex embodiments of the communication network may be alternatively used. For example, the communication network could include multiple PBX's located in either the home or roaming systems. Additionally, although the trunk 20 illustrated in FIG. 1 suggests a direct connection between the home PBX and roaming PBX, it should be appreciated that multiple trunks and/or ties could be used to operatively connect the home and roaming systems 12, 14.

A. Registering with the Communication System

Figure 2:
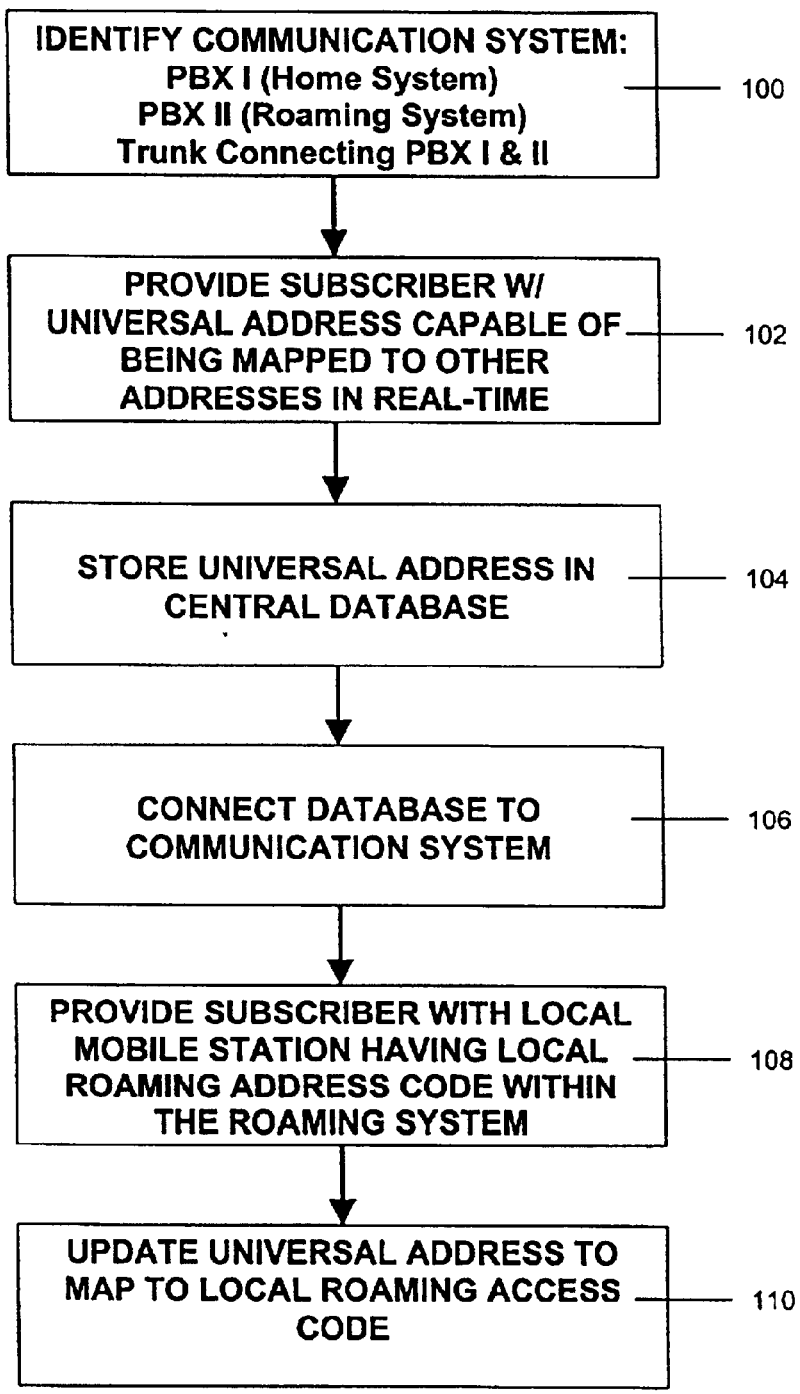
FIG. 2. is a flow chart illustrating an exemplary process for preparing a subscriber to send and receive communication through the system of FIG. 1.

Referring now to FIG. 2, a flow chart illustrating the steps necessary to set up a subscriber to send and/or receive calls through the communication system 10 of FIG. 1 is shown. First, the underlying communication network including the first PBX in the home system, the second PBX in the roaming system and the trunk operatively connecting the first PBX and the second PBX is identified (step 100). Each subscriber of the communication network is then provided with a universal address that is capable of being mapped, preferably in real-time, to various individual communication addresses of the subscriber (step 102). The universal addresses are stored in the database that is in communication with the first PBX 16 and the second PBX 18 (steps 104 and 106). When the subscriber travels to the roaming system, he is provided with a local mobile station having a local roaming address code within the roaming system (step 108), which he then maps to his universal address (step 110). Once this has occurred, the subscriber is ready to send and/or receive calls through the communication system 10.

A.1. Initializing a Universal Address

Figure 3A:
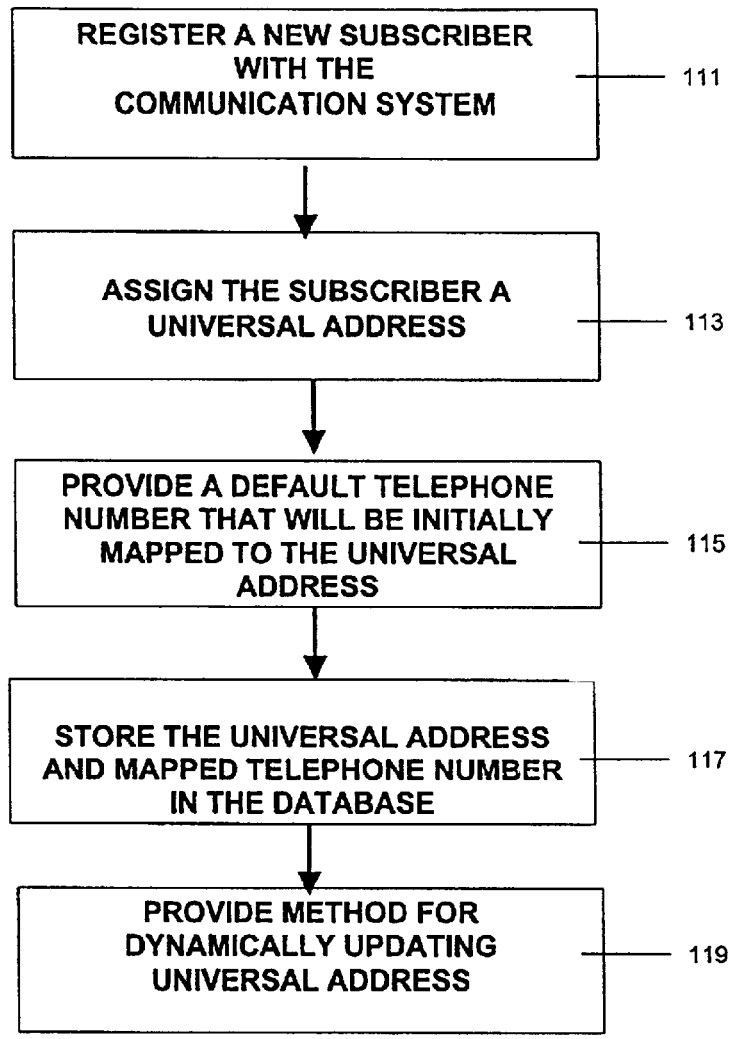
FIG. 3 are flow charts and screen shots illustrating an exemplary process for initializing a universal address for a subscriber in the system of FIG. 1.

Referring now to FIG. 3A, a flow chart illustrating the steps necessary to initialize a universal address within the communication system is shown. First, a new subscriber is registered with the communication system (step 111). The subscriber is assigned a universal address (step 113) and a default telephone number is provided that will be initially mapped to the universal address (step 115). Once this information has been provided, all of the relevant information is stored within the database of the system (117). Finally, the subscriber is provided with a method for dynamically updating his universal address to map to one or more different local address codes when he is roaming outside of the home system (step 119).

Figure 3B:
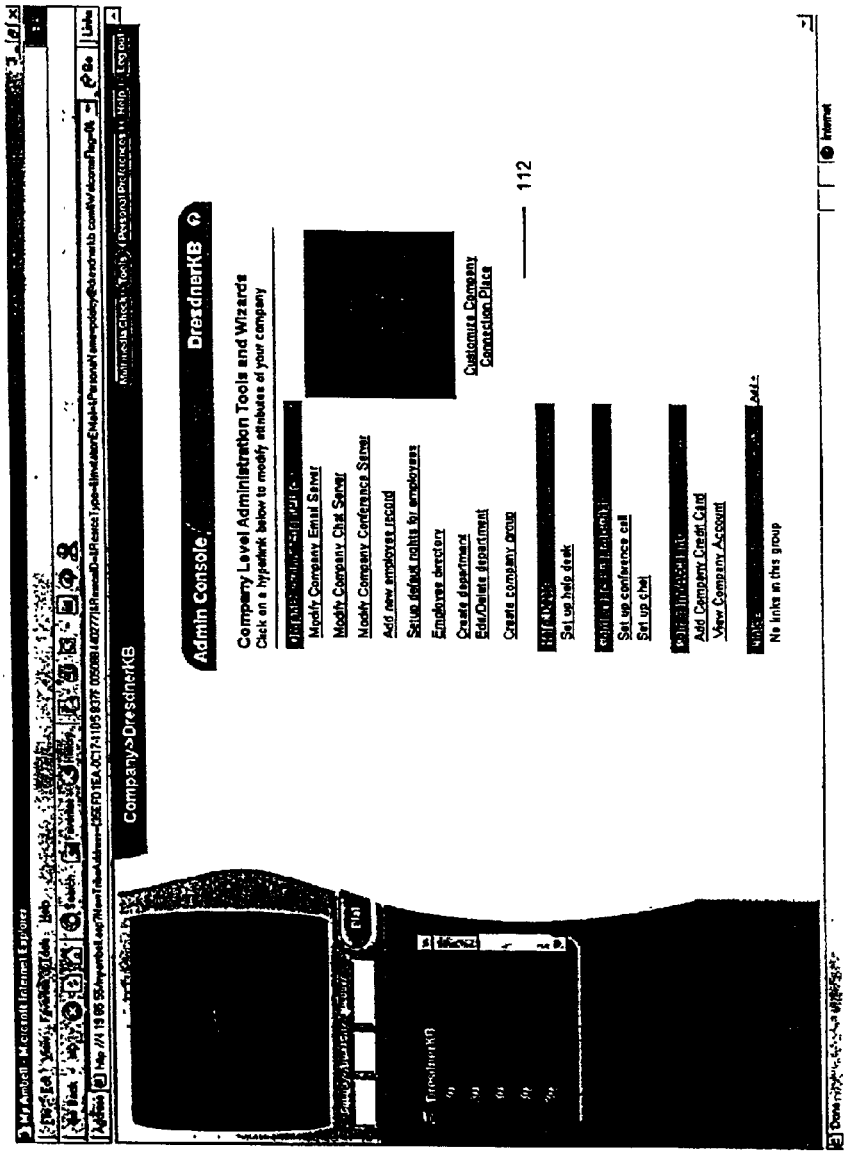
Figure 3C:
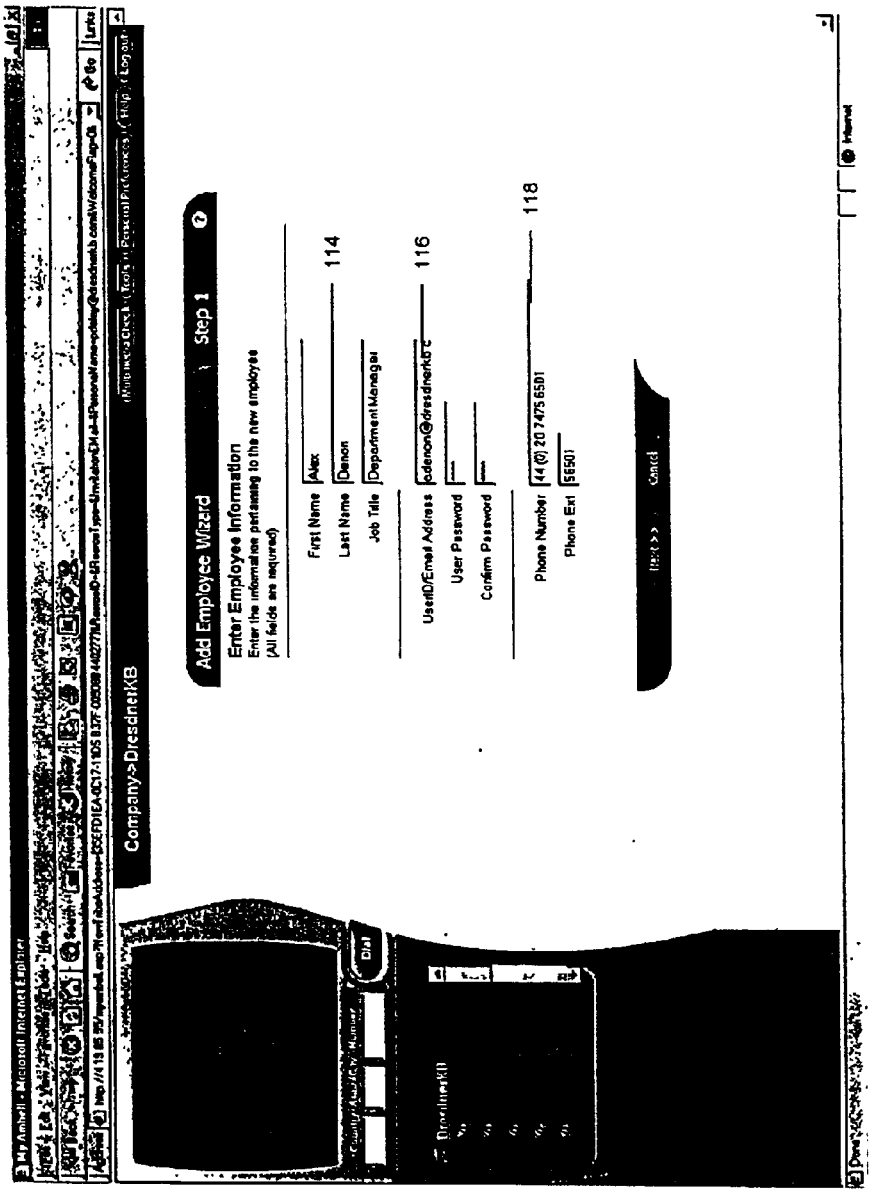

Referring now to FIG. 3B, an exemplary process for initializing a universal address is illustrated through a series of screen shots from a Web-based interface of the communication system. FIG. 3B is a screen shot of an administrator console 112 of a Web-based interface for the communication system. Using this console, an administrator is able to add a new subscriber (e.g., employee of a company) to the communication system. Selecting the ADD A NEW EMPLOYEE RECORD link from the administrator console will provide access to an area where new subscribers can be added. FIG. 3C is a screen shot of an ADD EMPLOYEE wizard that will intuitively guide an administrator through the process of adding a new subscriber. For example, the administrator will be prompted to enter specific information about the subscriber, such as first and last name 114, user ID or universal address 116, and a default telephone number 118 that will be initially mapped to the universal address for the subscriber. In the example illustrated in FIG. 3C, the universal address is ADENON@DRESDNERKB.COM and the default telephone number that will initially be mapped to that address is 44 (0) 20 7475 6501. Once this information is submitted through the Web-based interface, it will be transferred to the database 22 of the communication system so that the subscriber's universal address and mapped telephone numbers will be available within the system. Once this information has been stored in the database, the subscriber is ready to send and/or receive calls through the system as described in more detail below. As a result, anyone trying to reach this subscriber can access the communication system and request to be connected with ADENON@DRESDNERKB.COM. The communication system will map this universal address to the appropriate telephone number, which in the current example would be the default number 44 (0) 20 7475 6501.

In order to accommodate the subscriber when roaming, the communication system must be capable of dynamically updating the telephone number that is mapped to the subscriber's universal address. For example, when the subscriber travels outside of the home system, he will want to be able to map his universal address to another telephone number. This can be accomplished by, for example, allowing the subscriber and/or administrator to access the Web-based interface for the communication system and manually change the telephone number that is mapped to the subscriber's universal address. Alternatively, as described in more detail below, the communication system can provide for an automated, or partially-automated, method for updating the universal address of a subscriber when roaming. Those skilled in the art should also realize that other conventional methods for registering subscribers of a communication system and/or initializing a universal address may alternatively be utilized with the present invention.

B. Roaming within the Communication System

B.1. Obtaining a Local Mobile Station

As noted above, in order for the communication system 10 to reduce or eliminate international roaming costs, it is necessary for the subscriber to have a local mobile station having a local roaming address code within the roaming system. There are a variety of different methods that could be used for providing the subscriber with such a local mobile station. For example, a subscriber could simply pick up the local mobile station from a pre-designated location (e.g., a local office of an enterprise within the communication system) whenever he traveled to the roaming system, and the subscriber would return the local mobile station when he left the roaming system. Under this scenario, it would be possible for the communication system to have a set of local mobile stations available within the roaming system for temporary use by subscribers when they traveled to the roaming system. Alternatively, a subscriber could permanently own a local mobile station for each of the roaming systems in which he typically travels. Under this scenario, the subscriber would simply have to remember to take the appropriate local mobile station with him when he traveled to each respective roaming system. Alternatively, if available, the subscriber could use a single mobile station that was capable of having multiple accounts in different systems (e.g., account A in home system A, account B in home system B, etc.) and seamlessly switch between and/or selecting the appropriate account based on the geographic location of the subscriber.

B.2. Updating a Universal Address

Figure 4:
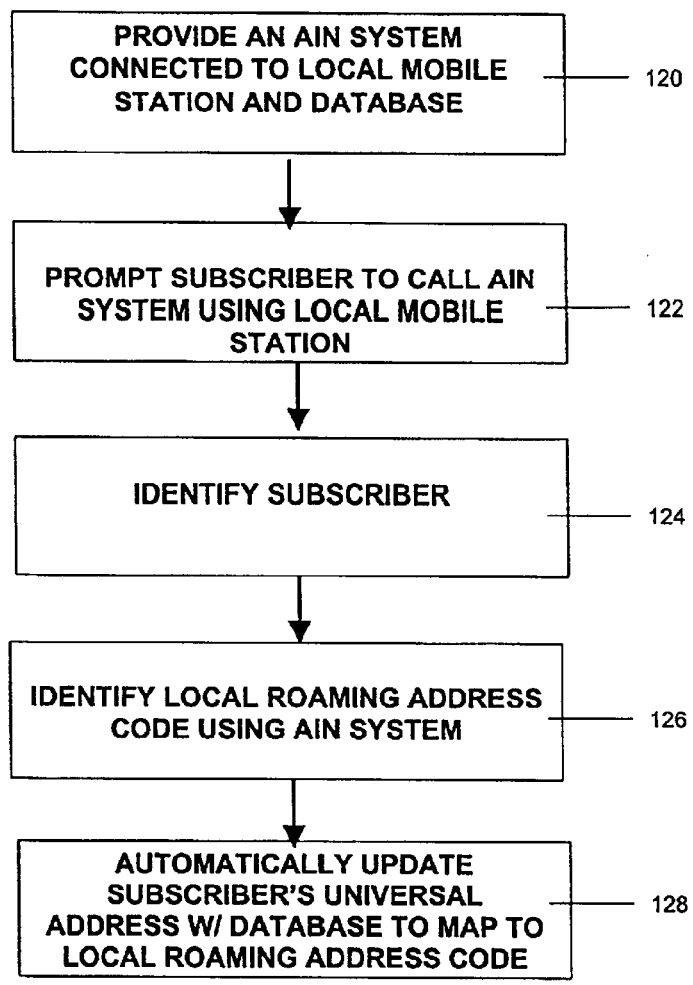
FIG. 4 is a flow chart illustrating an exemplary process for updating a subscriber's universal address when roaming within the system of FIG. 1.

Regardless of the particular method by which the subscriber obtains the local mobile station, once he reaches the roaming system it is necessary to update his universal address so that he is ready to send and/or receive communications to the universal address through the communication system. There are a variety of different methods that could be used by the subscriber to update his universal address. One possible method would be to require the subscriber to access the communication system 10 via a browser and the World Wide Web and manually change the settings associated with his universal address. Alternatively, the updating process can be simplified and automated, in part, through the use of an automatic number identification (ANI) system. In a presently preferred embodiment of the invention disclosed herein, the communication system includes an ANI system 28 operatively coupled to and in communication with the database (see FIG. 1). Referring now to FIG. 4, a flow chart illustrating the steps involved in updating a universal address using the ANI system is shown. Once the ANI system is connected to the communication system (step 120), the subscriber is prompted to call into the communication network using the local mobile station (step 122). Once the subscriber is connected to the communication network through the local mobile station, the ANI system automatically identifies and stores the local roaming address code of the local mobile station (step 126). The ANI system then communicates with the database and updates the subscriber's universal address to map to the local roaming address code (step 128).

Programming the local mobile station to automate the process of calling the ANI system may enhance the updating process described above. For example, one or more of the keys on the local mobile station may be programmed to automatically dial (e.g., speed dial) the communication and/or ANI system when pressed by the subscriber. The subscriber can then be prompted, through audio (e.g., a pre-recorded message on the local mobile station) or visual (e.g., a text or graphic indicator on the local mobile station or programmed key) prompts to press the appropriate key on the local mobile station to access the ANI system. Additionally, even though the ANI system can automatically identify and store the local roaming address code of the local mobile station, it is necessary for the communication system to properly identify the subscriber so that the local roaming address code can be mapped to the appropriate universal address in the system. To do so, the communication system may prompt the subscriber to enter a unique identifier (e.g., user name and/or password) when he calls into the system. In a presently preferred embodiment of the invention disclosed herein, the communication system includes an automatic speech recognition (ASR) system 30 operatively coupled to and in communication with the database. As a result, the subscriber's voice and/or verbal instructions can be used by the communication system to properly identify the subscriber so that the local roaming address code can be mapped to his universal address stored in the system (step 124). Combining the use of the ANI and ASR systems may greatly simplify the process a subscriber is required to go through in order to update his universal address.

C. Receiving Calls through the Communication System while Roaming

Figure 5:
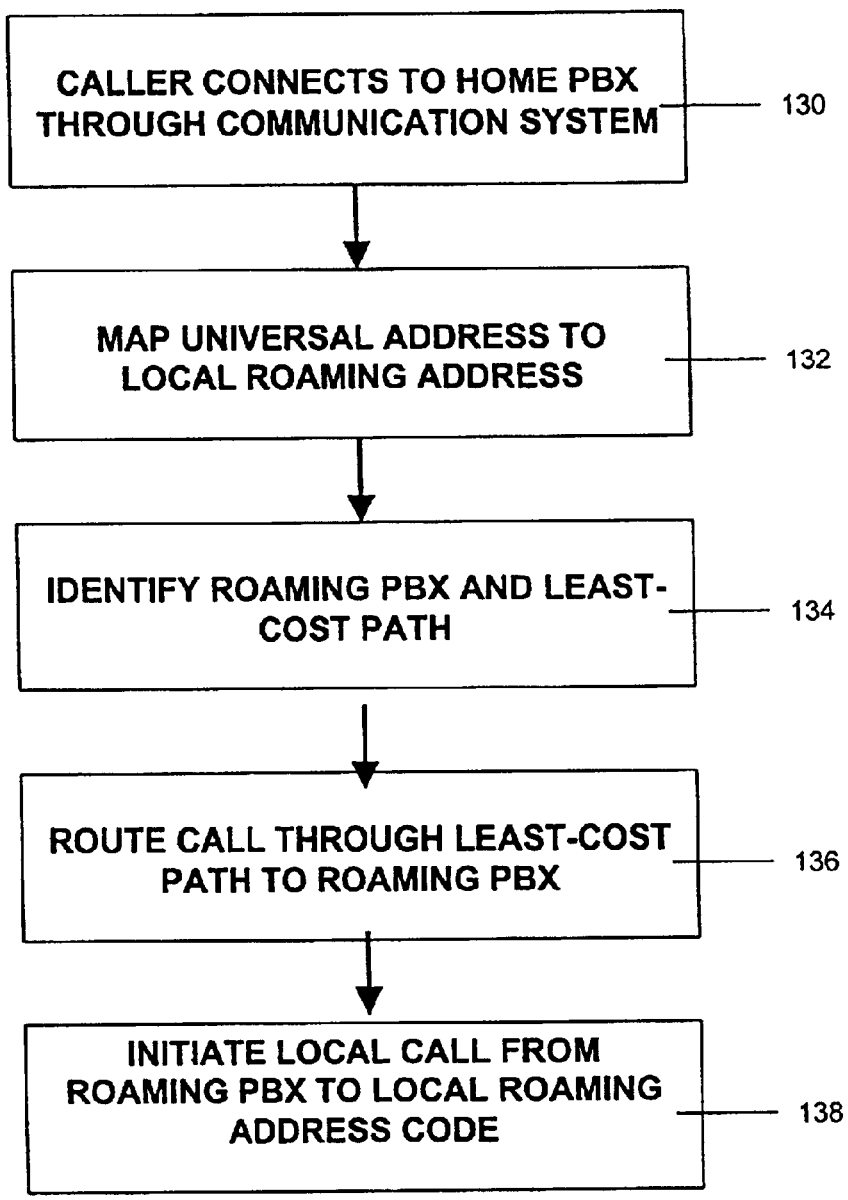
FIG. 5 is a flow chart illustrating an exemplary process for receiving communication while roaming within the system of FIG. 1.

Referring now to FIG. 5, a flow chart illustrating the steps involved in receiving a call through the communication system 10 of FIG. 1 while roaming is shown. A caller attempting to reach the subscriber from the home system 12 will dial into the communication system from a communication device 32 in the home system and enter the subscriber's universal address (step 130). In a presently preferred embodiment, the caller attempting to reach the subscriber from the home system will dial into, or be connected with, the home PBX via a local call. Since the subscriber has already updated the database to indicate that he is located in the roaming system at the local roaming address code (step 122), the communication system will access the database, preferably through the telephony server, and automatically map the subscriber's universal address to the local roaming address code (step 132). Using the local roaming address code to identify the roaming PBX 18, the telephony server then sends instructions to the home PBX 16 to route the call to the roaming PBX, preferably through the trunk 20 (steps 134 and 136). Additionally, the telephony server instructs the roaming PBX to initiate a local call to the subscriber's local mobile station using the local roaming address code (step 138), and the communication system connects the caller with the subscriber at this number.

Using the communication system disclosed herein to receive calls when roaming may result in significant cost savings. Specifically, without leveraging the communication network, the subscriber could expect to pay somewhere around $1.35 per minute for a call that he receives on his mobile telephone while roaming. In contrast, by routing the call through the communication network to take advantage of its existing infrastructure, the same call can be converted into (1) a local call from the caller to the home PBX 16 in the home system, (2) a call from the home PBX 16 to the roaming PBX 18 over the trunk 20, and (3) a local call from the roaming PBX 18 to the subscriber on the local mobile station through the local roaming address code. The resulting cost of the same call when leveraging the communication network as described above could be as little as $0.20 per minute. This is roughly the equivalent of a local call to the home PBX and a local call from the roaming PBX that each costs approximately $0.10 per minute, and a call from the home PBX to the roaming PBX that has an effective marginal cost of $0.00, assuming the trunk is owned or leased by the enterprise operating the communication system.

In order to regulate use of the communication system, it may be desirable to limit the use of the communication network to registered subscribers. For example, in a presently preferred embodiment, the process of receiving calls through the communication system additional requires that the caller be identified as a subscriber before he can place a call through the network. The process of identifying the caller may include requiring the entry of a unique identifier into the system (e.g. user name and/or password) before he can access the home PBX and/or database to reach someone using a universal address stored in the system.

C.1. Determining a Least-Cost Route

The cost-savings associated with routing the call through the communication network as described above results in a presently preferred embodiment, in part, from being able to leverage the existing infrastructure of the network. Specifically, the cost savings will be realized when the marginal cost of sending a particular communication over the trunk is effectively zero or negligible. Even where this is not the case, the same principles underlying the present invention can be utilized to reduce some of the costs associated with international roaming. In a more general sense, the communication system is designed to determine a least-cost path for routing the communication from the home PBX 16 to the roaming PBX 18, taking into consideration any costs associated with the various components of that path. In the preferred embodiment, the least-cost route is through the trunk because of the negligible marginal cost characteristic described above. Alternatively, the communication system can be programmed to determine a least-cost path from the home PBX to the roaming PBX for any communication through the system, and provide the home PBX with instructions to route the call through the least-cost path that has been identified.

D. Sending Calls through the Communication System while Roaming

Figure 6:
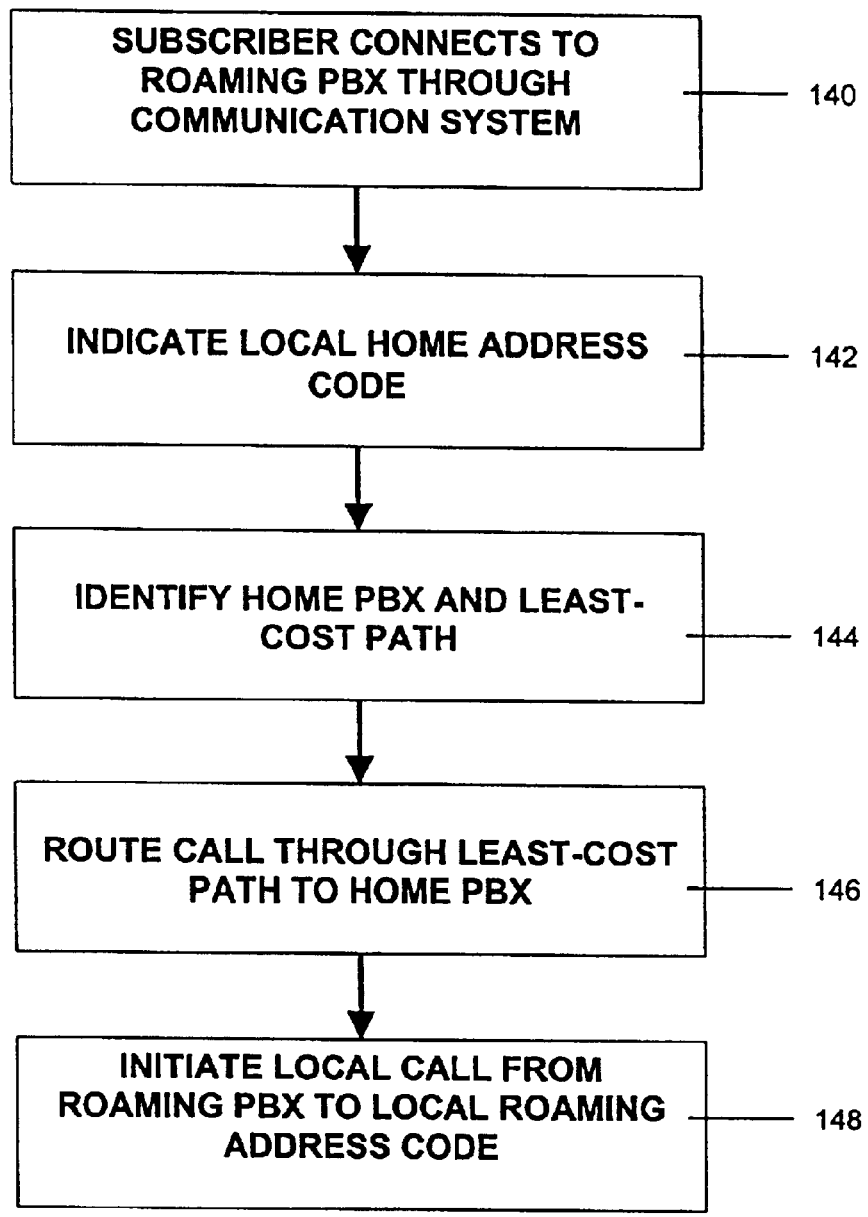
FIG. 6 is a flow chart illustrating an exemplary process for sending communication while roaming within the system of FIG. 1.

Referring now to FIG. 6, a flow chart illustrating the steps involved in sending a call through the communication system of FIG. 1 while roaming is shown. More specifically, the flow chart illustrates the steps involved when a subscriber attempts to reach a callee in the home system through the communication system, while he is roaming outside of the home system. The process is very similar to that described above in connection with receiving a call through the communication system while roaming. A subscriber attempting to reach a callee, in the home system, through his local mobile station while roaming will dial into the communication system and enter either the callee's universal address, if the callee is also a subscriber of the system, or the callee's local home address code in the home system. In a presently preferred embodiment, the subscriber attempting to reach the callee from the roaming system will dial into, or be connected with, the roaming PBX 18 from his local mobile station (step 140). If the callee has a universal address within the system, the communication system will access the database and automatically map the callee's universal address to his local home address code.

Alternatively, the communication system can use the local home access code to identify the home PBX (steps 142 and 144) and send instruction to the roaming PBX to route the call to the home PBX, preferably through the trunk (step 146). Additionally, the communication system instructs the home PBX to initiate a local call to the callee's local home address code, and connects the subscriber with the callee at this number (step 148). Many of the features of the communication system described above can also be utilized when sending a call through the system while roaming. For example, the subscriber may be required to identify himself as a subscriber before he can place a call through the network. The process of identifying the subscriber may include requiring the entry of a unique identifier into the system (e.g., user name and/or password) or requiring the use of the ASR system described above. Additionally, instead of automatically routing the call through the trunk, the communication system can be designed to determine a least-cost path for routing the communication from the roaming PBX to the home PBX, and for providing the roaming PBX with instruction to route the call through the least-cost path that has been identified in a manner similar to that described above.

The communication system provided for by the present application is ideally suited for use by an enterprise that has an international presence and members who frequently travel abroad and use a single mobile telephone to send and/or receive calls while at home or while traveling. For example, assume Company has offices in London, New York and Tokyo, and a number of employees that travel between the various offices on a regular occasion. Moreover, assume that Company has an existing communication infrastructure in place to support the intra and inter office communication needs of its locations, such as a local PBX at each office, and dedicated or leased lines between the offices connecting the respective PBXs. Furthermore, assume that Employee is based out of New York and has a local mobile telephone having a home account in New York which he uses when he travels abroad to the other locations of Company. During those trips abroad, Employee will likely experience significant international roaming expenses that either he will have to pay or will ask the Company to reimburse him for. If Company has a significantly large workforce that has similar characteristics to Employee, the aggregate international roaming expenses that it will incur on a regular basis will be substantial.

By implementing the communication system disclosed herein, Company can experience significant cost savings by simply reducing or eliminating the international roaming expenses incurred in these situations. For example, Company can have Employee register for a universal address (e.g., 1800 EMPLOYEE) that is initially mapped to his New York mobile telephone number. When Employee travels to the London office, Company can provide him with a local mobile telephone having a home account in London. The London mobile phone can be programmed to prompt Employee to update his universal address, for example, by pressing a particular key on the phone that automatically connects him to the London PBX which is in communication with an ANI and ASR system. The ASR system prompts Employee to identify himself, and uses that identification to map his universal address to the local London number assigned to his London mobile phone which is detected by the ANI system. Employee is now ready to send or receive communication through the Company's network.

If someone from the New York office of Company attempts to reach Employee while he is in London, they will be connected with the New York PBX and prompted to enter Employee's universal address. Entering 1800 EMPLOYEE into the system will prompt it to access the database and determine the appropriate number where Employee can be reached—in this case, the local London number he provided to the system. Once the system has obtained this number, it will instruct the New York PBX to route the call to the London PBX, preferably through the trunk or some other least-cost path, with instructions to the London PBX to connect the call to the local London number once it reaches there. As a result of using the communication system described and leveraging Company's communication network, Employee will not incur the international roaming charges he would have incurred if he received the call using his New York mobile telephone while working in London. Employee could also use the communication system to send calls from his London mobile telephone as described above so that he will not incur the international roaming charges he would have incurred if he sent the call using his New York mobile telephone while working in London. Referring now to Table 1, the potential cost savings resulting from using the communication system and leveraging Company's communication network are illustrated:

TABLE 1

| POTENTIAL COST SAVINGS RESULTING FROM THE USE OF THE COMMUNICATION SYSTEM | | | | |
|---|---|---|---|---|
| WITHOUT COMMUNICATION SYSTEM | $ PER MINUTE | WITH COMMUNICATION SYSTEM | $ PER MINUTE | SAVINGS ($ PER MINUTE) |
| Receiving Call from US phone on US Mobile While Roaming in UK | | Receiving Call from US phone on UK Mobile through Communication System While Roaming in UK | | |
| US Phone to US Mobile | $1.34 | US Phone to US PBX | $0.10 | |
| | | US PBX to UK PBX | $0.00 | |
| | | UK PBX to UK Mobile | $0.11 | |
| Total | $1.34 | Total | $0.21 | $1.13 |

TABLE 1-continued

POTENTIAL COST SAVINGS RESULTING FROM THE USE OF THE COMMUNICATION SYSTEM

| WITHOUT COMMUNICATION SYSTEM | $ PER MINUTE | WITH COMMUNICATION SYSTEM | $ PER MINUTE | SAVINGS ($ PER MINUTE) |
|---|---|---|---|---|
| Sending Call to US phone from US Mobile While Roaming in UK | | Sending Call to US phone on UK Mobile through Communication System While Roaming in UK | | |
| US Mobile to US Phone | $1.34 | UK Mobile to UK PBX | $0.08 | |
| | | UK PBX to US PBX | $0.00 | |
| | | US PBX to US Phone | $0.10 | |
| Total | $1.34 | Total | $0.18 | $1.15 |

While various embodiments of the present invention have been shown and described, it would be apparent to those skilled in the art that various modifications are possible without departing from the inventive concept disclosed herein. For example, although the communication system is described as leveraging a communication network having at least a local PBX in each system, those skilled in the art should realize that the PBXs may be replaced by a switch other similar equipment capable of providing connections to local and trunked communication networks. It is therefore to be understood that this invention may be practiced otherwise than as specifically described herein.

What is claimed is:

1. A method for providing real-time communication to a subscriber outside a home system in a communication network, wherein the communication network includes the home system and a roaming system, the method comprising the steps of:

providing access to a home switch located in the home system;

providing access to a roaming switch located in the roaming system;

providing access to a trunk operatively connecting the home switch to the roaming switch;

providing the subscriber with a universal address that can be mapped to one or more addresses of the subscriber;

storing the universal address in a database operatively connected to the home switch and the roaming switch;

providing the subscriber with a local mobile station having a local roaming address code within the roaming system;

updating the universal address to map to the local address code; and allowing the subscriber to receive incoming calls from the universal address within the roaming system through the local mobile station without incurring roaming charges.

2. The method of claim 1 further comprising the steps of:

when a caller attempts to reach the subscriber from the home system using the universal address:

receiving a call from the caller at the home switch;

accessing the database to map the universal address to the local roaming address code;

routing the call from the home switch to the roaming switch; and initiating a local call from the roaming switch to the local mobile station using the local roaming address code.

3. The method of claim 2 wherein the accessing step comprises dynamically accessing the database to map, in real-time, the universal address to the local roaming address code.

4. The method of claim 2 further comprising the steps of:

identifying the roaming switch using the local roaming address code; and routing the call from the home switch through the trunk with instructions to reach the roaming switch and initiate the local call to the local mobile station using the local roaming address code.

5. The method of claim 2 further comprising the steps of:

identifying the roaming switch using the local roaming address code; and routing the call from the home switch with instructions to follow a least-cost route to the roaming switch and initiate the local call to the local mobile station using the local roaming address code.

6. The method of claim 2 further comprising the steps of:

providing access to a telephony server in the home system, the telephony server operatively connected to the home switch and the database;

receiving the call from the caller at home switch;

routing the call from the home switch to the telephony server;

accessing the database through the telephony server to map the universal address to the local roaming address code;

identifying the roaming switch using the local roaming address code;

routing the call from the home switch with instructions to reach the roaming switch and initiate the local call to the local mobile station using the local roaming address code.

7. The method of claim 2 further comprising the steps of:

identifying the caller before accessing the database to map the universal address to the local roaming address code.

8. The method of claim 1 further comprising the step of:

when the subscriber attempts to reach a callee at a local home address code in the home system from the roaming system using the local mobile station:

receiving a call from the subscriber at the roaming switch;

routing the call from the roaming switch, through the trunk, to the home switch; and initiating a local call from the home switch to the local home address code.

9. The method of claim 8 further comprising the steps of:
identifying the home switch using the local home address code; and
routing the call from the roaming switch through the trunk with instructions to reach the home switch and initiate the local call to the local home address code.

10. The method of claim 8 further comprising the steps of:
identifying the home switch using the local home address code; and
routing the call from the roaming switch with instructions to follow a least-cost route to the home switch and initiate the local call to the local home address code.

11. The method of claim 8 further comprising the steps of:
identifying the subscriber before routing the call from the roaming switch to the home switch.

12. The method of claim 11 further comprising the step of:
providing access to an automatic speech recognition system for identifying the subscriber.

13. The method of claim 1 wherein the updating step further comprises the steps of:
providing access to an automatic number identification system operatively connected to the local mobile station and the database;
prompting the subscriber to call the automatic number identification system using the local mobile station;
identifying the local roaming address code using the automatic number identification system; and
automatically updating the universal address to map to the local roaming address code.

14. A communication system for providing real-time communication to a subscriber, the communication system comprising:
a home network having a home switch for receiving a call from a caller;
a roaming network having a roaming switch;
a trunk operatively connecting the home switch to the roaming switch;
a universal address for the subscriber, wherein the universal address can be mapped to one or more address of the subscriber;
a memory, operatively coupled to the home switch and the roaming switch, for storing the universal address; and
a local mobile station having a local roaming address code within the roaming system,
wherein, when the subscriber travels from the home network to the roaming network, the communication system:
provides the subscriber with the local mobile station,
updates the universal address to map to the local roaming address code, and
allows the subscriber to receiving incoming calls from the universal address within the roaming system through the local mobile station without incurring roaming charges.

15. The communication system of claim 14 further comprising:
a system for prompting the caller for the universal address,
wherein, when the caller attempts to reach the subscriber from the home system using the universal address, the communication system:
receives the call at the home switch,
prompts the caller for the universal address,
accesses the memory to map the universal address to the local roaming address code,
routes the call from the home switch to the roaming switch, and
initiates a local call from the roaming switch to the local mobile station using the local roaming address code.

16. The communication system of claim 15 further comprising a system for identifying the roaming switch using the local roaming address code, wherein, the call is routed from the home switch with instructions to reach the roaming switch and initiate the local call to the local mobile station using the local roaming address code.

17. The communication system of claim 16 further comprising a system for determining a least-cost route between the home switch and the roaming switch, wherein, the call is routed from the home switch with instructions to follow the least-cost route to the roaming switch and initiate the local call to the local mobile station using the local roaming address code.

18. The communication system of claim 15 further comprising:
a telephony server in the home system, the telephony server operatively connected to the home switch and the memory, wherein, when the caller attempts to reach the subscriber from the home system using the universal address, the communication system:
receives the call at the home switch,
routes the call from the home switch to the telephony server,
accesses the memory to map the universal address to the local roaming address code,
identifies the roaming switch using the local roaming address code, and
routes the call from the home switch with instructions to reach the roaming switch and initiate the local call to the local mobile station using the local roaming address code.

19. The communication system of claim 14 further comprising a system for identifying the subscriber, wherein, when the subscriber attempts to reach a callee at a local home address code in the home system from the roaming system using the local mobile station, the communication system:
identifies the subscriber,
receives a call from the subscriber at the roaming switch,
routes the call from the roaming switch, through the trunk, to the home switch, and
initiates a local call from the home switch to the local home address code.

20. The communication system of claim 19 further comprising a system for identifying the home switch using the local home address code, wherein, when the subscriber attempts to reach the callee at the local home address code, the communication system:
identifies the home switch using the local address code; and
routes the call from the roaming switch with instructions to reach the home switch and initiate the local call to the local home address code.

21. The communication system of claim 20 further comprising a system for determining a least-cost route between the roaming switch and the home switch, wherein, the call is routed from the roaming switch with instructions to follow the least-cost route to the home switch and initiate the local call to the local home address code.

22. The communication system of claim 14 further comprising an automatic number identification system operatively connected to the local mobile station and the memory, wherein, the subscriber is prompted to call the automatic number identification system using the local mobile station, the automatic number identification system automatically identifies the local roaming address code, and the universal address in the memory is updated to map to the local roaming address code.

23. A communication system for providing real-time communication to a subscriber, the communication system comprising:

a home network having a home PBX for receiving a call from a caller, a roaming network having a roaming PBX;

means for operatively connecting the home PBX to the roaming PBX;

a universal address for the subscriber;

means for dynamically mapping the universal address to one or more addresses of the subscriber;

means for storing the universal address so that it can be accessed, in real-time, by the home PBX and the roaming PBX;

a local mobile station having a local roaming address code within the roaming system;

means for providing the subscriber with the local mobile station when he travels to the roaming network;

means for updating the universal address to map to the local roaming code; and means for the subscriber to communicate with others in real-time through the local mobile station using the universal address within the roaming system without incurring roaming charges.

24. The communication system of claim 23 further comprising:

means for receiving the call at the home PBX;

means for prompting the caller for the universal address;

means for accessing the database to map the universal address to the local roaming address code;

means for routing the call from the home PBX to the roaming PBX; and means for initiating a local call from the roaming PBX to the local mobile station using the local roaming address code.

25. The communication system of claim 24 further comprising:

means for identifying the roaming PBX using the local roaming address code; and means for routing the call from the home PBX with instructions to reach the roaming PBX and initiate the local call to the local mobile station using the local roaming address code.

26. The communication system of claim 25 further comprising:

means for determining a least-cost route between the home PBX and the roaming PBX; and means for routing the call from the home PBX with instructions to follow the least-cost route to the roaming PBX and initiate the local call to the local mobile station using the local roaming address code.

27. The communication system of claim 24 further comprising:

a telephony server in the home system, the telephony server operatively connected to the home PBX and the database;

means for routing the call from the home PBX to the telephony server;

means for identifying the roaming PBX using the local roaming address code; and means for routing the call from the telephony server to the home PBX with instructions to reach the roaming PBX and initiate the local call to the local mobile station using the local roaming address code.

28. The communication system of claim 23 further comprising:

means for, when the subscriber attempts to reach a callee at a local home address code in the home system from the roaming system using the local mobile station, receiving a call from the subscriber at the roaming PBX;

means for routing the call from the roaming PBX to the home PBX; and means for initiating a local call from the home PBX to the local home address code.

29. The communication system of claim 28 further comprising:

means for identifying the home PBX using the local home address code; and means for routing the call from the roaming PBX with instructions to reach the home PBX and initiate the local call to the local home address code.

30. The communication system of claim 29 further comprising:

means for determining a least-cost route between the roaming PBX and the home PBX; and means for routing the call from the roaming PBX with instructions to follow the least-cost route to the home PBX and initiate the local call to the local home address code.

31. The communication system of claim 23 further comprising:

means for automatically identifying the local roaming address code when the subscriber accesses the communication system using the local mobile station and updating the universal address to map to the local roaming address code.

* * * * *